June 9, 1936.  J. O. LALANCETTE  2,043,756
FREE VISION WINDSHIELD
Filed Sept. 6, 1933  2 Sheets-Sheet 1
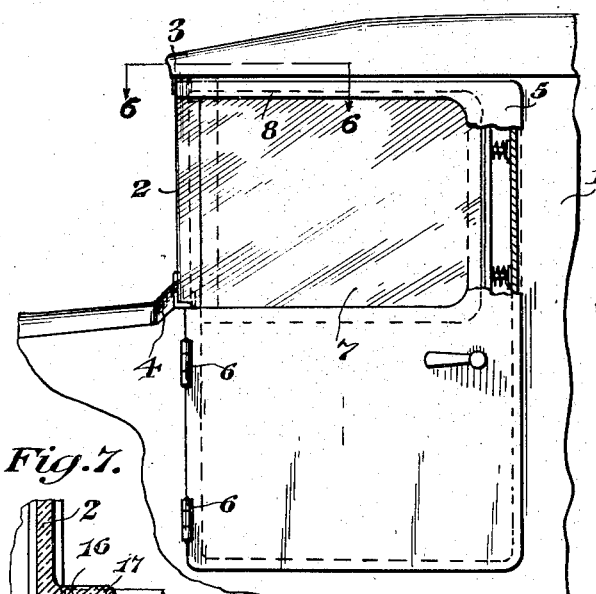
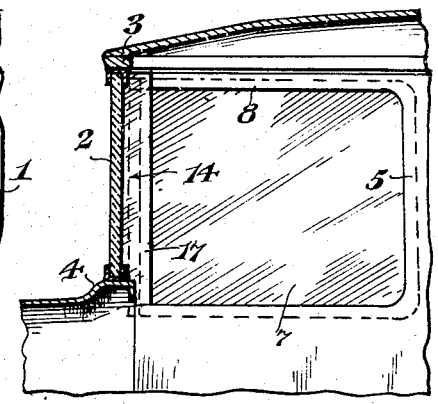
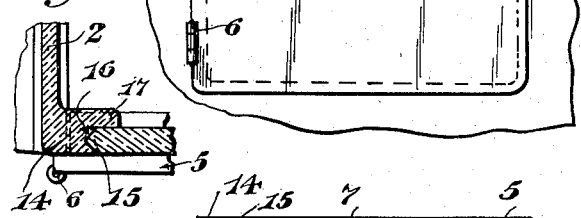
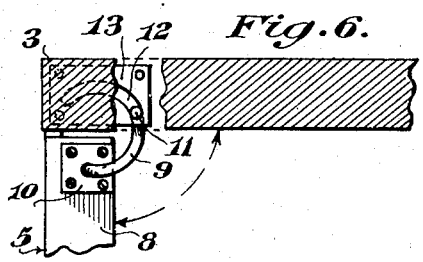
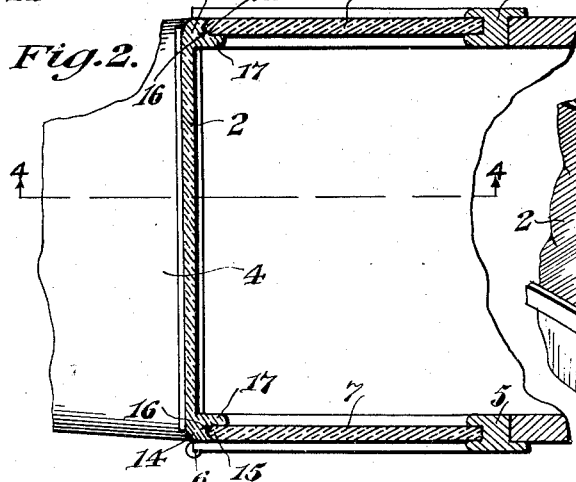
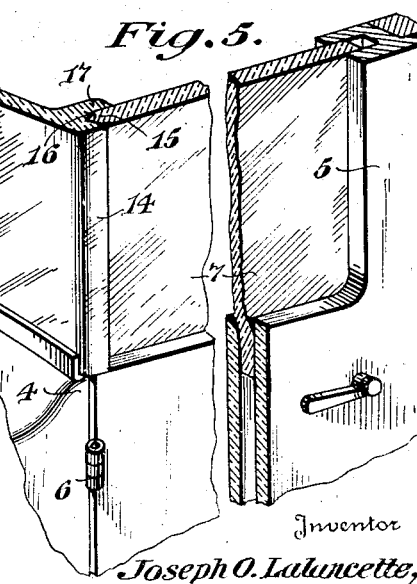
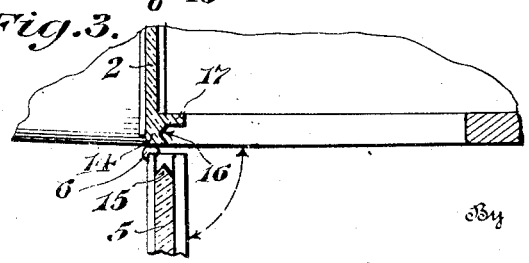
Inventor
Joseph O. Lalancette,
By Irving L. McCathran
Attorney

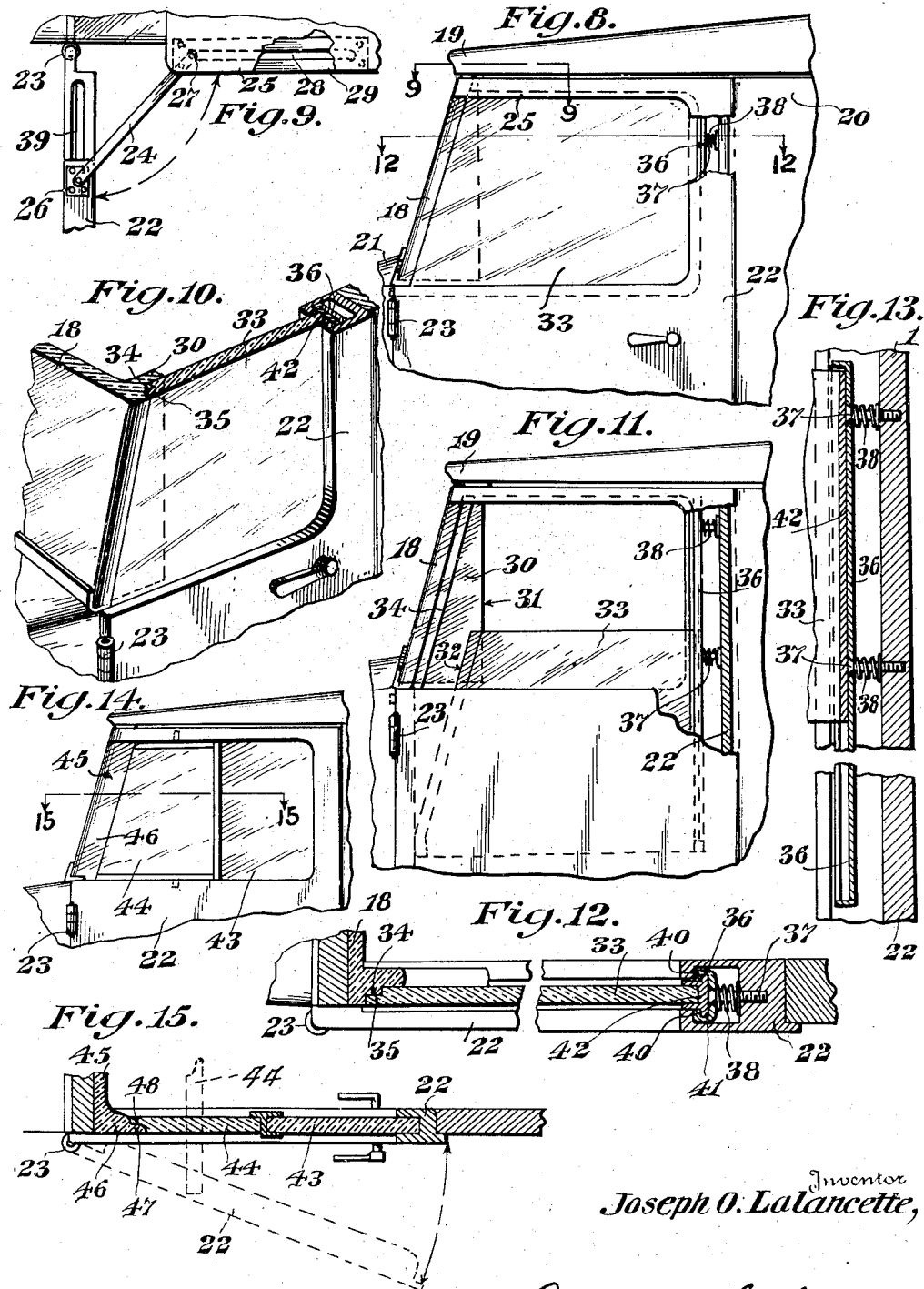

Patented June 9, 1936

2,043,756

UNITED STATES PATENT OFFICE 2,043,756

FREE VISION WINDSHIELD

Joseph Ovila Lalancette, Springfield, Mass.

Application September 6, 1933, Serial No. 688,374

6 Claims. (Cl. 296—84)

This invention relates to vehicle bodies and windshield construction and has for its object the production of a simple and efficient vehicle body and windshield construction wherein the opaque corner brace is entirely eliminated and a free vision windshield is provided completely of transparent material extending across the front of the vehicle and down the sides of the windows of the front doors.

One of the principal objects of the present invention is the production of a simple and efficient water tight joint formed between the windshield and the window pane of the door of the vehicle so constructed as to permit the door to be readily opened and closed and when in a closed position to provide an efficient joint between the window pane and the windshield.

A further object of this invention is the production of a simple and efficient means for mounting and hanging the door in such a manner as to permit the window pane carried by the door and the edge of a windshield to abut when the door is in a closed position and at the same time provide an efficient hinging support for the door.

A further object of this invention is the production of a simple and efficient means for holding the window pane of the door or glass panel thereof in a proper position and at the same time permitting the glass panel to be properly adjusted.

With these and other objects in view, this invention consists in certain novel constructions, combinations and arrangements of parts as will be hereinafter more fully described and claimed.

In the drawings:—

Figure 1 is a side elevation of a portion of a vehicle showing the improved free vision windshield and the manner in which the glass panel of the door abuts against the end of the windshield;

Figure 2 is a horizontal sectional view taken through the forward portion of the vehicle shown in Figure 1 and illustrating the manner in which the glass panels of the doors interfit against the ends of the windshield;

Figure 3 is a horizontal sectional view through a portion of an end of the windshield and a portion of the door, the door being shown in its open position;

Figure 4 is a vertical sectional view taken upon the line 4—4 of Figure 2;

Figure 5 is a fragmentary perspective view illustrating the structure of one corner or end of the windshield and the interfitting joint of the glass panel carried by the door;

Figure 6 is an enlarged section taken on line 6—6 of Figure 1;

Figure 7 is an enlarged horizontal sectional view through one corner of the windshield and illustrating a portion of the glass panel and the interlocking joint between the windshield and the glass panel of the door;

Figure 8 is a side elevation of a modified form of the invention illustrating a slanting or inclined windshield;

Figure 9 is a section taken on line 9—9 of Figure 8, the door being shown in an open position;

Figure 10 is a sectional perspective view of a portion of the inclined windshield and illustrating the structure of the glass panel carried by the door and the support for the glass pane;

Figure 11 is a side elevation of a portion of a vehicle showing the glass panel of the door in an open position;

Figure 12 is a section taken on line 12—12 of Figure 8;

Figure 13 is an enlarged vertical section illustrating the spring pressed trackway for the sliding panel of the door, of the type illustrated in Figures 8 and 11;

Figure 14 is a side elevation of a modified form of the invention illustrating a ventilating window in the glass panel of the door of the vehicle; and Figure 15 is a section taken on line 15—15 of Figure 14.

By referring to the drawings it will be seen that 1 designates the body of the vehicle which is preferably constructed of the modern type or design, wherein the body is preferably constructed of metal having the front end thereof open for the purpose of receiving the windshield 2, which windshield may be supported either permanently or adjustably in any desired manner without departing from the spirit of the invention. The windshield is preferably supported between the forward end of the overhanging top of the body of the vehicle and the cowl 4.

The door 5 is also open at its forward end and this door is preferably hinged, as at 6, to the body of the vehicle along its front edge below the window panel 7. The door 5 is provided with an overhanging hinging strip 8 at its top, which hinging strip is secured to the underface of the overhanging portion 3 of the top of the vehicle by means of a curved hook 9 which is carried as at 10 by the overhanging strip 8 of the door 5, and this hook is provided with an upturned end 11 which travels in an arc slot 12 formed in the anchoring plate 13, the anchoring plate 13 being carried by the underface of the overhanging portion 3 of the top of the vehicle. This structure will limit the outward swing of the door 5 upon the body 1 and at the same time provide an efficient connection for the upper end of the door. The windshield 2 is preferably constructed of glass or other suitable transparent material common to the trade, and at each end thereof the windshield 2 is provided with a thickened enlargement which is also transparent and is indicated by the numeral 14 which enlargement 14 extends rearwardly at right angles to the longitudinal axis of the windshield and vertically along its side edge. The door 5 carries a glass panel 7 as previously stated, which glass panel may be adjusted vertically through the usual raising and lowering mechanism and this glass panel 7 is provided along its forward edge with a vertically extending substantially V-shaped rib 15, which is adapted to fit into a vertically extending substantially V-shaped channel 16 formed in the rear outer faces of the enlarged ends 14 of the windshield 2. The enlarged end portions of the windshield 2 are each provided with an inwardly extending flange portion 17 against which the inner face of the glass panel 7 abuts, this flange 17 projecting inwardly beyond the vertically extending channel 16 formed at each end of the windshield. The flange 17 at each end of the windshield extends, when the door is closed, along the inner face of the glass panel 7 of the door. When the door is closed, this structure will provide a complete seal and due to the fact that the hinges 6 are mounted at the forward edge of the door 5 and upon the outside of the body, it will be seen that the glass panel will be drawn away from the thickened end portions 14 of the windshield when the door is swung open, but when the door is swung to a closed position, the vertically extending substantially V-shaped rib of the glass panel 7 will snugly fit within the substantially V-shaped channel 16 formed at the end of the windshield and provide an efficient interfitting joint between the windshield 2 and the glass panel 7, firmly bracing the parts when closed, and at the same time providing a free vision windshield totally unobstructed extending from the rear edge of the door around the sides of the panel 7, and corners of the windshield 2 as well as across the windshield. No opaque or other reinforcement which would tend to obscure the vision, is found necessary, or is provided at the corner junction between the door panels 7 and the ends 14 of the windshield 2. This structure also will provide not only a free vision, but owing to the manner in which the door is hung, the parts will freely swing to and from an open position without danger of shattering the glass or jamming the parts when in operation.

By referring particularly to sheet 2 of the drawings, and in the structure illustrated in Figures 8 to 15, the structure illustrated is especially provided for use in connection with an inclined windshield 18. The inclined windshield may be supported in any suitable or desired manner between the overhanging end 19 of the top of the vehicle body 20 and the cowl 21. The door 22 is hinged at its forward outer edge, as at 23, and a bracing link 24 is pivotally secured to the overhanging portion 25 of the door 22 by means of a pivot plate 26, as shown in Figure 9. This link 24 is provided with a suitable pin 27 at one end which travels in a longitudinally extending slot 28 of the plate 29, the plate 29 being secured to the underface of the overhanging portion 19 of the top of the vehicle to limit the outward swing of the door 22, as is common with such devices. The windshield 18 is provided at each end with a rearwardly extending flange 30, the rear edge of which extends in a vertical plane, as indicated at 31, to permit the inclined edge 32 of the transparent door panel 33 to, at all times, overlap irrespective as to its vertical adjustment. An offset interlocking joint 34 is formed upon the outer edge of each end of the windshield and upon the outside face of the flange 30 and this offset joint 34 conforms to the contour of the offset or step-like formation 35 of the panel 33 along its forward edge. Consequently, it will be seen that as the panel 33 is raised to a closed position a tight interfitting joint will be provided along the abutting edges of the windshield 18 and the panel 33. The inner face of the panel 33 is adapted to abut snugly against the adjacent face of the flange 30 as is clearly illustrated in Figure 12. In order that the panel 33 may be properly supported at its rear end into vertical adjustment, a spring pressed trackway 36 is provided and carried by the door frame 22, this spring pressed trackway being supported upon the guiding screws 37 and coil springs 38 are carried by the screws 37 for normally exerting a forward press upon the rear edge of the panel 33. The front edge of the door 22 is provided with a channel 39 for receiving the front edge of the panel 33 and this structure will provide an efficient brace for the panel to prevent the same from rattling. The trackway 36 is substantially U-shaped in cross-section and is provided with inturned marginal flanges 40 which fit snugly over and around the laterally extending flanges 41 of the shoe bead 42 firmly secured to the rear face of the panel 33. The shoe bead 42 is preferably U-shaped in cross-section to straddle the rear edge of the panel 33, and each panel 33 of each of the front doors of the vehicle is preferably similarly constructed.

In Figures 14 and 15 there is shown a side door panel 43 of the conventional sliding type having a forward ventilating panel 44 of suitable design journaled for swinging movement from a position shown in full lines in Figure 15 to a position shown in dotted lines in the same figure. In this type of structure, a windshield 45 is illustrated having a thickened end portion 46 at each side edge and a rearwardly projecting tongue 47 which is adapted to overhang a similarly constructed tongue 48 formed along the forward marginal edge of the ventilating panel 44. The particular type of ventilating panel may be varied without departing from the spirit of the invention and certain other changes may be employed so long as these changes fall within the scope of the appended claims.

Having described the invention, what I claim as new is:—

1. A device of the class described comprising a vehicle body, a windshield mounted upon the vehicle body and having integral shaped side edges, a door hinged along its forward edge to said body in a manner to be swung outwardly and away from the edge of the windshield when the door is moved to an open position, a panel carried by said door and having a formed and shaped forward edge to snugly interfit with the edge of the windshield to provide a weatherproof and free vision joint, and an abutment flange formed integrally with the windshield of transparent material at each end thereof and adapted to abut against the inner faces of the door panels when the door is moved to a closed position.

2. A device of the class described comprising a vehicle body, a windshield mounted upon the vehicle body and having shaped side edges, a door hinged along its forward edge to said body in a manner to be swung outwardly and away from the edge of the windshield when the door is moved to an open position, a panel carried by said door and having a formed and shaped forward edge to snugly interfit with the edge of the windshield to provide a weatherproof and free vision joint, an abutment flange formed integrally with the windshield of transparent material at each end thereof and adapted to abut against the inner face of the door panels when the door is moved to a closed position, the formed edge of each end of the windshield comprising a substantially V-shaped channel, and the formed forward edges of said panel comprising a substantially V-shaped tongue for interfitting in one of said channels.

3. A device of the class described comprising a vehicle body, a windshield mounted upon the vehicle body and having shaped side edges, a door hinged along its forward edge to said body in a manner to be swung outwardly and away from the edge of the windshield when the door is moved to an open position, a panel carried by said door and having a formed and shaped forward edge to snugly interfit with the edges of the windshield to provide a weatherproof and free vision joint, an abutment flange formed integrally with the windshield of transparent material at each end thereof and adapted to abut against the inner face of the door panel when the door is moved to a closed position, the formed edge of each end of the windshield comprising a substantially V-shaped channel, the formed forward edges of said panel comprising a substantially V-shaped tongue for interfitting in one of said channels, the flange at each end of said windshield being adapted to at all times overlap the forward edge of said door panel irrespective as to the adjusted positions of the adjacent door panels.

4. A device of the class described comprising a vehicle body, a windshield mounted upon the vehicle body and having shaped side edges, a door hinged along its forward edge to said body in a manner to be swung outwardly and away from the edge of the windshield when the door is moved to an open position, a panel carried by said door and having a formed and shaped forward edge to snugly interfit with the edge of the windshield to provide a weatherproof and free vision joint, an abutment flange formed integrally with the windshield of transparent material at each end thereof and adapted to abut against the inner face of the door panel when the door is moved to a closed position, the flange at each end of said windshield being adapted to at all times overlap the forward edge of said door panel irrespective as to the adjusted positions of said door panel, said windshield being inclined outwardly toward its bottom, and the flange at each end of said windshield being wider at its bottom than at its top.

5. In a device of the class described comprising a transparent windshield having a transparent thickened end portion and a right angularly extending integral rearwardly projecting flange along its inner rear edge inset from the outer end of said windshield, a door hinged adjacent the end of the windshield, a panel carried by said door in a position near the end of the windshield, the forward edge of the panel being provided with an interfitting overlapping joint to provide a seal and brace between the end of the windshield and the forward edge of the panel when the door is in a closed position, the door panel and the windshield providing a continuous transparent shield along the side around the corner and across the front of the windshield and panel.

6. A device of the class described comprising a windshield having an enlarged rearwardly extending transparent end, a door, an adjustable panel, a ventilating panel supported adjacent said first mentioned panel, the ventilating panel being mounted for movement away from the enlarged portion of said windshield, and said ventilating panel and rearwardly extending transparent end having an interfitting joint connection for providing a tight fit between the panel and windshield end when the panel is in a closed position.

JOSEPH OVILA LALANCETTE.